US009261982B2

(12) United States Patent
Chen

(10) Patent No.: US 9,261,982 B2
(45) Date of Patent: Feb. 16, 2016

(54) IMAGE ADJUSTING METHOD AND OPTICAL NAVIGATING APPARATUS UTILIZING THE IMAGE ADJUSTING METHOD

(71) Applicant: PixArt Imaging Inc., Hsin-Chu (TW)

(72) Inventor: Tzu-Yu Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 177 days.

(21) Appl. No.: 13/802,819

(22) Filed: Mar. 14, 2013

(65) Prior Publication Data

US 2014/0152567 A1 Jun. 5, 2014

(30) Foreign Application Priority Data

Dec. 4, 2012 (TW) .............................. 101145448 A

(51) Int. Cl.
*G06F 3/0354* (2013.01)
*G06T 5/00* (2006.01)

(52) U.S. Cl.
CPC ............ *G06F 3/03543* (2013.01); *G06T 5/009* (2013.01)

(58) Field of Classification Search
CPC ............................... G06T 5/00; G06F 3/03543
USPC ............ 360/166, 163, 618, 617, 77; 382/274; 345/166, 163, 618, 617, 77
See application file for complete search history.

(56) References Cited

U.S. PATENT DOCUMENTS

| 6,175,659 B1* | 1/2001 | Huang | G06T 3/403 382/266 |
| 2004/0119682 A1* | 6/2004 | Levine | G06F 3/038 345/156 |
| 2004/0212593 A1* | 10/2004 | Wang | G06F 3/0317 345/166 |
| 2007/0046829 A1* | 3/2007 | Su | H04N 5/57 348/678 |
| 2008/0118176 A1* | 5/2008 | Li | G06T 5/009 382/274 |
| 2009/0033682 A1* | 2/2009 | Kaida | H04N 9/646 345/634 |
| 2009/0102793 A1* | 4/2009 | Bohn | G06F 3/03543 345/166 |
| 2011/0025604 A1* | 2/2011 | Chang | G06F 3/03543 345/166 |
| 2012/0188262 A1* | 7/2012 | Rabii | G09G 5/393 345/534 |

* cited by examiner

Primary Examiner — Thomas Alunkal
(74) Attorney, Agent, or Firm — Winston Hsu; Scott Margo

(57) ABSTRACT

A computer readable recording media, having at least one program code recorded thereon, an image adjusting method can be performed when the program code is read and executed. The image adjusting method comprises: catching a current image; computing at least one kind of brightness information of the current image; respectively setting corresponding threshold values to different kinds of the brightness information; and determining if a contrast enhancing operation should be performed to the current image to generate an adjusted image according to a number that the brightness information is over the threshold value.

20 Claims, 6 Drawing Sheets

IM

IM

IMAGE ADJUSTING METHOD AND OPTICAL NAVIGATING APPARATUS UTILIZING THE IMAGE ADJUSTING METHOD

BACKGROUND OF THE INVENTION

1. Field of the Invention

The present invention relates to an image adjusting method and an optical navigating apparatus utilizing the image adjusting method, and particularly relates to an image adjusting method and an optical navigating apparatus utilizing the image adjusting method, which can perform contrast enhancing according to various brightness information of the image.

2. Description of the Prior Art

An optical navigating apparatus, such as an optical mouse, utilizes an image sensor to catch continuous images, and then utilizes the features of these images (ex. brightness) to compute displacement of the optical navigating apparatus. However, the caught images may be affected by some factors such that the images are out of focus or have indefinite features, thus the computing for displacement may have error.

For example, the printed circuit board thickness which the image sensor is provided on must be controlled to fall in a predetermined range, or the caught image may be out of focus. Alternatively, the surface that the optical navigating apparatus passes may have no apparent features, such that the image may have indefinite features.

SUMMARY OF THE INVENTION

Therefore, one objective of the present invention is to provide an image adjusting method, which utilizes brightness information of an image to determine if a contrast enhancing operation should be performed to an image and the intensity of the contrast enhancing operation.

Another objective of the present invention is to provide an optical navigating apparatus utilizing the above-mentioned image adjusting method, which utilizes brightness information of an image to determine if a contrast enhancing operation should be performed to an image and the intensity of the contrast enhancing operation, such that a clearer image can be provided. By this way, the optical navigating apparatus can perform a more accurate displacement detecting operation.

One embodiment of the present invention discloses a computer readable recording media, having at least one program code recorded thereon, an image adjusting method can be performed when the program code is read and executed. The image adjusting method comprises: catching a current image; computing at least one kind of brightness information of the current image; respectively setting corresponding threshold values to different kinds of the brightness information; and determining if a contrast enhancing operation should be performed to the current image to generate an adjusted image according to a number that the brightness information is over the threshold value.

Another embodiment of the present invention discloses an optical navigating apparatus, which comprises: at least one light source, for emitting light to an object; an image sensor, for catching a current image that is generated via the object and the light; and a displacement detecting module, for computing at least one kind of brightness information of the current image, for respectively setting corresponding threshold values to different kinds of the brightness information, and for determining if a contrast enhancing operation should be performed to the current image to generate an adjusted image according to a number that the brightness information is over the threshold value. The displacement detecting module determines if displacement exists between the object and the optical navigating apparatus according to the adjusted image if the displacement detecting module performs the contrast enhancing operation. The displacement detecting module determines if displacement exists between the object and the optical navigating apparatus according to the current image if the displacement detecting module does not perform the contrast enhancing operation.

In view of above-mentioned embodiments, various kinds of brightness information can be utilized to determine if the image should be adjusted or not. Also, the indefinite feature of the brightness information or the image can be utilized to determine how to adjust the contrast of the image. By this way, a more clear image can be acquired, thereby the problem that the image may be out of focus or has indefinite features as described in the prior art can be solved. Also, the optical navigation utilizing the images adjusted by these mechanisms can perform more accurate displacement detecting.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
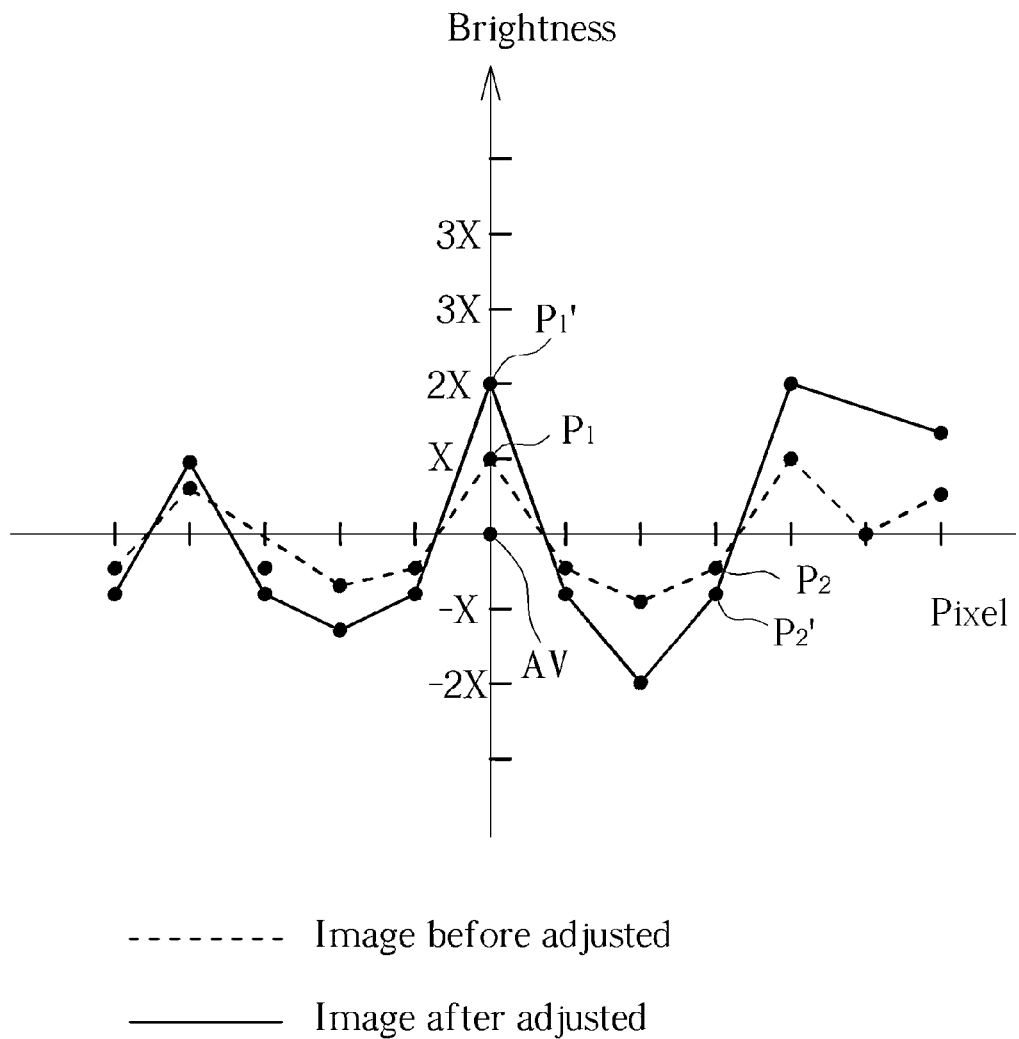
FIG. 1 is a schematic diagram illustrating an image adjusting method according to the embodiment of the present invention.

FIG. 1 is a schematic diagram illustrating an image adjusting method according to the embodiment of the present invention. Please note FIG. 1 only illustrates one example and does not mean to limit the scope of the present invention. As shown in FIG. 1, an average brightness value AV is computed, which can be the average brightness value for a previous image, or the average brightness value for a current image. After that, a brightness value difference between a pixel to be adjusted brightness value and the average brightness value AV, and the brightness value difference is utilized to adjust the pixel to be adjusted. For example, it is supposed that the brightness value difference between a brightness value for a pixel to be adjusted $P_1$ and the average brightness value AV is X, and then the pixel to be adjusted $P_1$ is adjusted to be an adjusted pixel $P_1'$, such that the brightness value difference between the adjusted pixel $P_1'$ and the average brightness value AV is doubled. That is, the adjusted pixel $P_1'$ has a brightness value 2X. In another embodiment, the brightness value difference between a brightness value for a pixel to be adjusted $P_2$ and the average brightness value AV is $-0.5X$, then the pixel to be adjusted $P_2$ is also adjusted to be an adjusted pixel $P_2'$, such that the brightness value difference between the adjusted pixel P$_2$' and the average brightness value AV is doubled. Therefore, the adjusted pixel P$_2$' has a brightness value −X. However, the brightness difference between the adjusted pixel and the average brightness value AV is not limited to be twice the brightness difference between a brightness value of the pixel to be adjusted and the average brightness value AV. The ratio between these two brightness values can be other values. Also, other brightness information of the image can be utilized to adjust this ratio, and be utilized to determine if the contrast enhancing operation should be performed.

Figure 2:
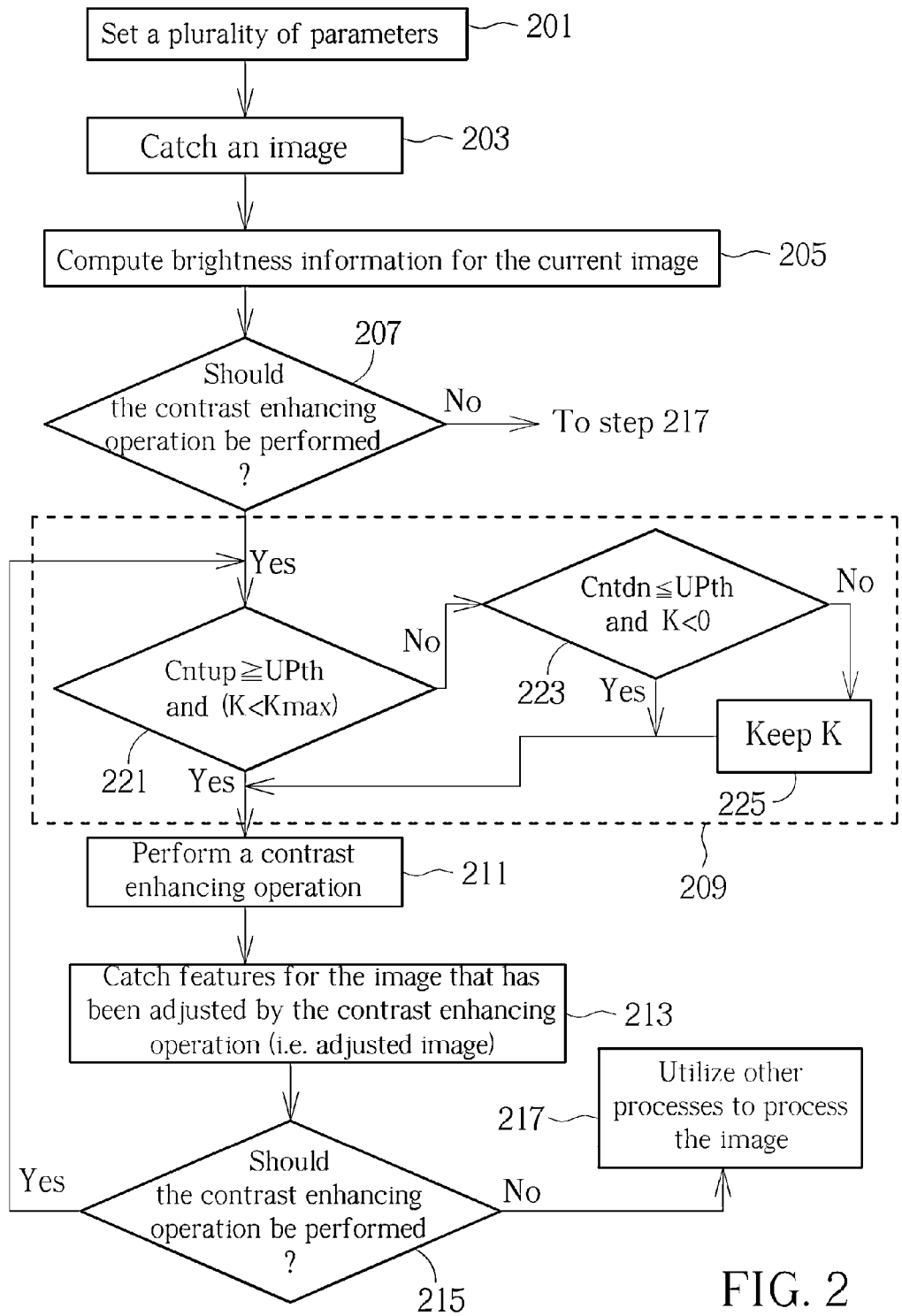
FIG. 2 is a detail flow chart for the image adjusting method according to the embodiment of the present invention.

FIG. 2 is a detail flow chart for the image adjusting method according to the embodiment of the present invention. FIG. 2 comprises the following steps:

Step 201

Set a plurality of parameters, which include various kinds of threshold values. In the following steps, the brightness information is compared with these threshold values, and it is determined if the contrast enhancing operation should be performed and if the ratio should be adjusted according to the comparing result.

Step 203

Catch an image.

Step 205

Compute brightness information for the current image. The brightness information includes at least one of the following information: an average brightness value of the current image; a maximum brightness value of the current image; a minimum brightness value of the current image; a brightness range of the current image (i.e. difference between a maximum brightness value and a minimum brightness value of the image); a pixel number for current image pixels having a brightness value smaller than a minimum brightness threshold value; a pixel number for current image pixels having a brightness value larger than a maximum brightness threshold value; and a maximum value of brightness value differences for adjacent pixels of the current image.

Step 207

Compare the brightness information and the threshold values, and determine if the contrast enhancing operation should be performed according to the comparing result. If yes, go to step 209, if not, go to step 217.

The determining mechanism can include only one determining mechanism or more than one determining mechanisms. For example, it can be determined if the contrast enhancing operation should be performed or not according to at lease one of: the average brightness value of the image, the maximum brightness value of the image; and the minimum brightness value of the image. Besides, it also can be determined according to a brightness range of the current image. The image is easy to be identified if the brightness range of the current image is large enough, thus no contrast enhancing operation is needed. Additionally, either a pixel number for current image pixels having a brightness value smaller than a minimum brightness threshold value, or a pixel number for current image pixels having a brightness value larger than a maximum brightness threshold value, can be utilized to determine if the contrast enhancing operation should be performed or not. If these two pixel numbers are large, it may indicate that the image is too dark or too bright, thus the feature for such image still be indefinite even the contrast enhancing operation is performed. Alternatively, the maximum value of brightness value differences for adjacent pixels of the image can be utilized to determine if the contrast enhancing operation should be performed or not. If the brightness value differences for adjacent pixels are large enough, it means the image is easy to be identified, thus no contrast enhancing operation is needed.

Step 209

The step 209 is utilized to determine the ratio, that is, the K in the step 211. In one embodiment, a value of K is determined by a number that the brightness information is larger than the threshold value. For example, a parameter Cetup that indicates a number that the pixels in the current image are too dark is computed in the step 221. If the parameter Cetup is larger than the threshold value Upth and K is not larger than the threshold value Kmax, then K is increased. In the step 223, a parameter Cetdn that indicates a number that the pixels in the current image are too bright is computed. If the parameter Cetdn is larger than the threshold value dnth and K is not 0, then K is decreased. If both the parameters Cetup and the Cetdn are less than the threshold values, go to step 225 and keeps K. The orders of the steps 221 and 223 can be exchanged. However, please not the steps 221, 223 and 225 are only for example, but also other mechanisms can also be utilized to set K.

Step 211

Perform a contrast enhancing operation.

In one embodiment, the following Equation (1) is utilized to perform the contrast enhancing operation:

$$P'=P+(P-\text{avg}_{cur})*K \quad \text{Equation (1)}$$

P indicates the pixel to be adjusted brightness value before adjusting, P' indicates the pixel to be adjusted brightness value after adjusting (i.e. the adjusted pixel), $\text{avg}_{cur}$ indicates the average brightness value of the current image, K is relative to the brightness information and is a rational number. The contrast enhancing operation shown in FIG. 1 is an example with K=1. Therefore, the operation corresponding to Equation (1) includes the following steps: computing a brightness value difference between a pixel to be adjusted brightness value (P) for a pixel to be adjusted in the current image and the average brightness value ($\text{avg}_{cur}$); and adjusting the pixel to be adjusted according to the brightness value difference, the pixel to be adjusted brightness value and the brightness information (i.e. determining K).

In another embodiment, the following Equation (2) is utilized to perform the contrast enhancing operation:

$$P'=P+(P-\text{avg}_{pre})*K \quad \text{Equation (2)}$$

P indicates the pixel to be adjusted brightness value before adjusting, P' indicates the pixel to be adjusted brightness value after adjusting (i.e. the adjusted pixel), $\text{avg}_{pre}$ indicates the average brightness value of a previous image, K is relative to the brightness information and is a rational number. The contrast enhancing operation shown in FIG. 1 is an example with K=1. Therefore, the operation corresponding to Equation (2) includes the following steps: computing a brightness value difference between a pixel to be adjusted brightness value (P) for a pixel to be adjusted in the current image and the average brightness value ($\text{avg}_{pre}$); and adjusting the pixel to be adjusted according to the brightness value difference, the pixel to be adjusted brightness value and the brightness information (i.e. determining K).

In one embodiment, the average brightness value of the image that is not performed the contrast enhancing operation and which of the image that has been adjusted by the contrast enhancing operation are the same, but it does not mean to limit.

Step 213

Catch features for the image that has been adjusted by the contrast enhancing operation (i.e. adjusted image).

Step 215

Determine if the contrast enhancing operation should be performed or not according to the feature caught in the step 213. For example, if various indefinite features still exist in the image, it means the next image may need contrast enhancing operation. If it is determined that the contrast enhancing operation is needed, back to the step 209. If not, go to step 217.

Step 217

Utilize other processes to process the image. For example, utilize a normal process having no contrast enhancing operation to catch the image and compute displacement for the optical navigating apparatus, while utilizing the optical navigating apparatus.

In view of above-mentioned embodiments, an image adjusting method according to one embodiment of the present invention can b acquired, which includes the following steps: (a) catch a current image; (b) compute at least one kind of brightness information of the current image; (c) respectively set corresponding threshold values to different kinds of the brightness information; and (d) determine if a contrast enhancing operation should be performed to the current image to generate an adjusted image according to a number that the brightness information is over the threshold value. Such image adjusting method can be performed via executing program code recorded on a computer readable recording media.

Figure 3:
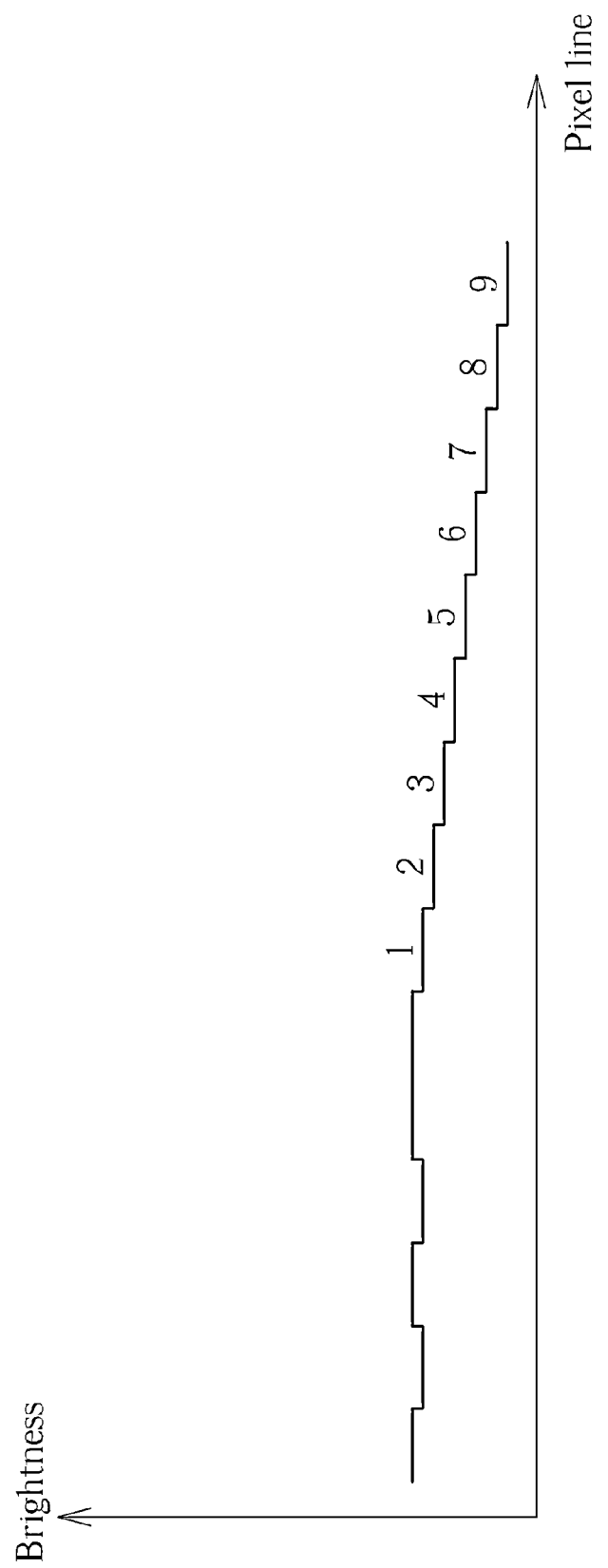
FIG. 3 is a schematic diagram illustrating a de-gradient operation according to the embodiment of the present invention.

Before computing the brightness information, a de-gradient operation can be performed to make the brightness distribution for the image more uniform. FIG. 3 is a schematic diagram illustrating a de-gradient operation according to the embodiment of the present invention. In this embodiment, the average brightness value of the image is computed first, and then the average brightness value of each pixel line is compared with which of the adjacent pixel lines, such that a brightness tendency can be acquired. For example, the pixel line 2 is compared with the pixel line 3 and the pixel line 1. Alternatively, the pixel line 3 is compared with the pixel line 2 and the pixel line 4. By this way, the relations between the average brightness value of each pixel line and which of a previous pixel line or a next pixel line thereof can be acquired, such that the brightness tendency of the image can be acquired as well. In the example of FIG. 3, the image can be determined that is has a brightness tendency for becoming dark. In such case, if the contrast enhancing operation is performed without the de-gradient operation, an incorrect adjusted image may be generated such that the accuracy for displacement computing of the optical navigating apparatus is affected.

Many methods can be applied to perform the de-gradient operation. In one example, an average brightness value for a whole image can be acquired, and then each pixel line is compensated (ex. increase or decrease the brightness value) according to the brightness value difference between the average brightness value for the whole image and the average brightness value for each pixel line. Besides the average brightness value for each pixel line, the brightness tendency of the image can be computed according to a maximum brightness value or a minimum brightness value for each pixel line. For example, a maximum brightness value of the pixel line 2 is compared with which of the pixel line 3 and which of the pixel line 1. Alternatively, a maximum brightness value of the pixel line 3 is compared with which of the pixel line 2 and which of the pixel line 4. In one embodiment, if the brightness tendencies computed according to the average brightness value, the maximum brightness value and the minimum brightness value are different, no de-gradient operation is performed.

Figure 4:
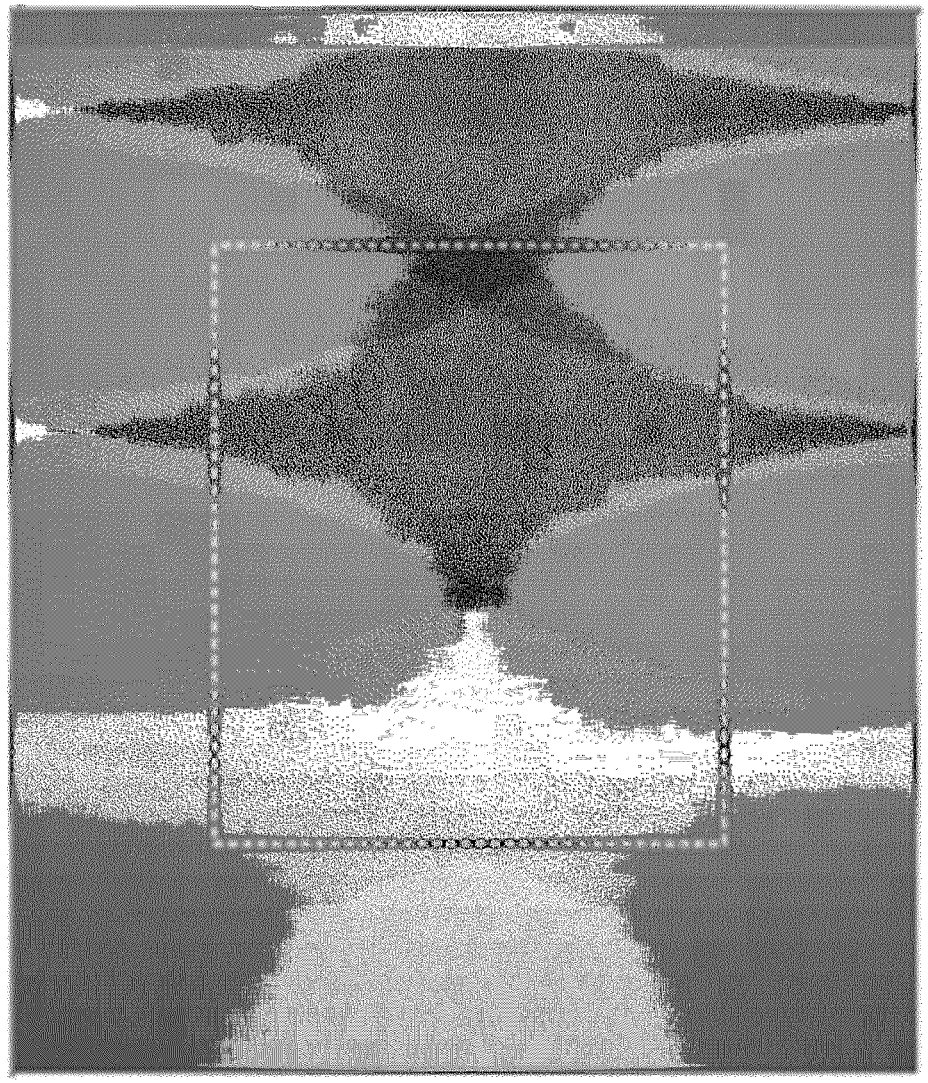
FIG. 4 is a schematic diagram illustrating the image before de-gradient operation.
Figure 5:
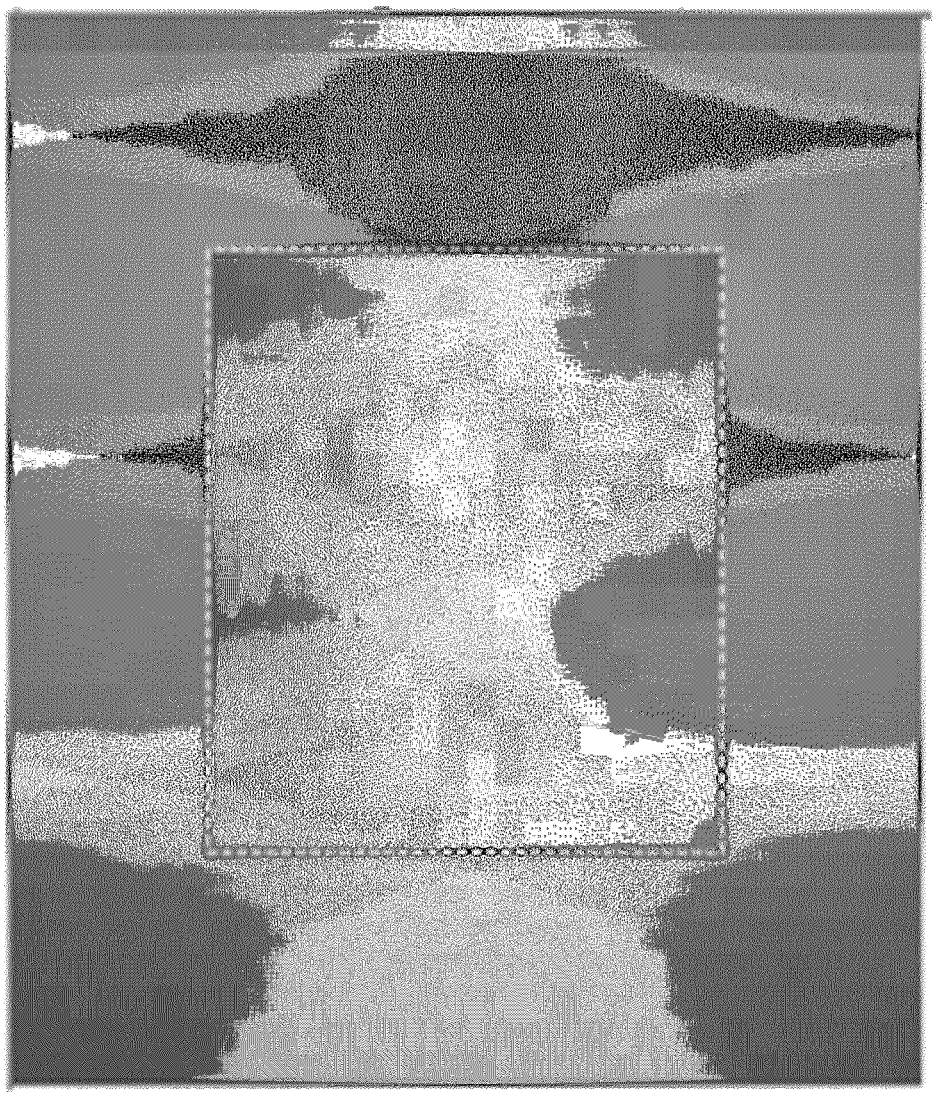
FIG. 5 is a schematic diagram illustrating the image after de-gradient operation.

FIG. 4 is a schematic diagram illustrating the image before de-gradient operation, which corresponds to the embodiment shown in FIG. 3. As shown in FIG. 4, the image IM has a brightness tendency that becomes dark up-down. After the de-gradient operation, the image IM shown in FIG. 5 has uniform brightness distribution.

Figure 6:
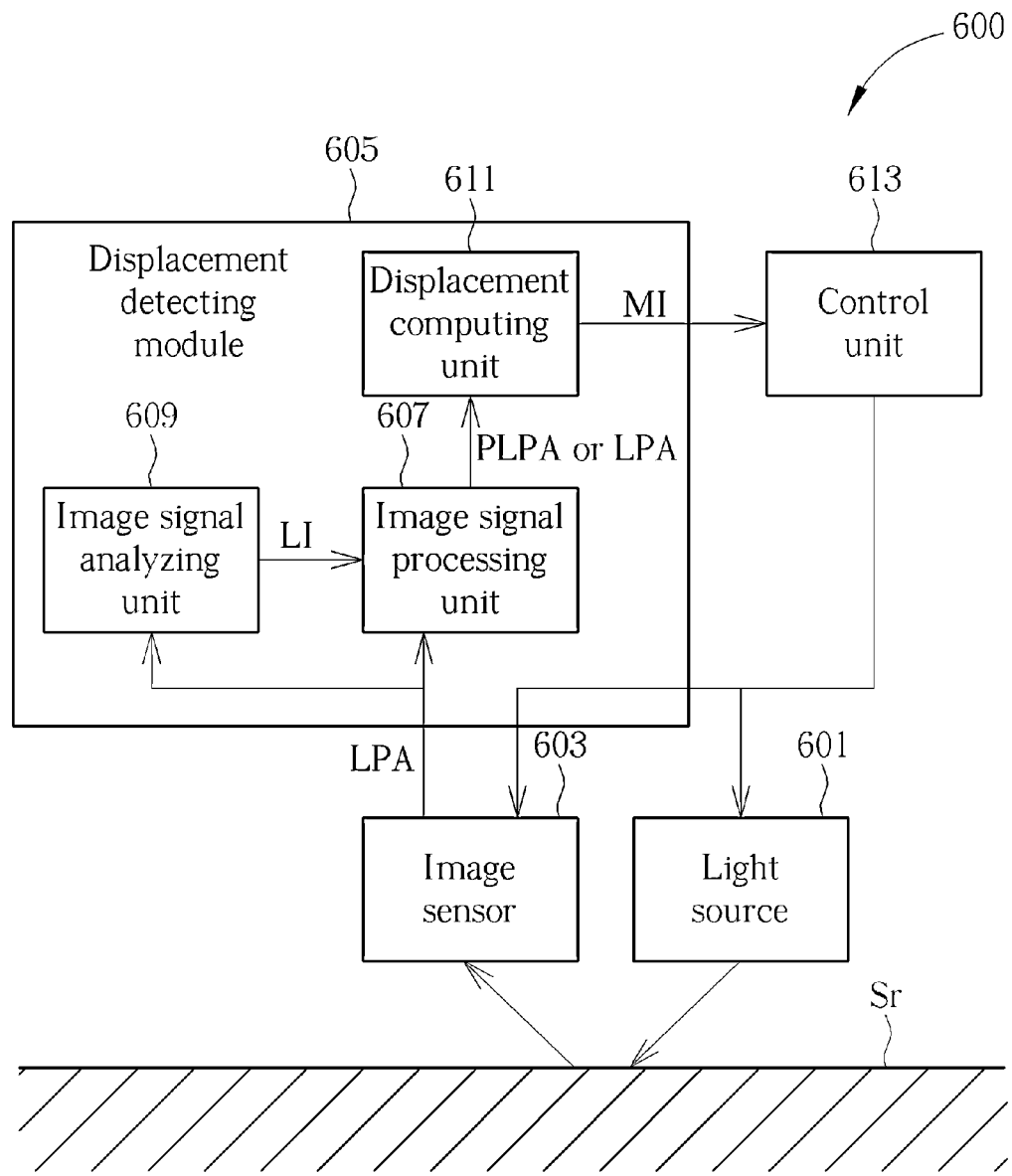
FIG. 6 is a block diagram illustrating an optical navigating apparatus according to one embodiment of the present invention.

FIG. 6 is a block diagram illustrating an optical navigating apparatus according to one embodiment of the present invention. Please note the optical navigating apparatus according to the present invention is not limited to have all devices shown in FIG. 6. As shown in FIG. 6, the optical navigating apparatus 600 includes a light source 601 (or more than one light sources), an image sensor 603, and a displacement detecting module 605. The light source 601 emits light to an object (a surface Sr in this embodiment). The image sensor 603 catches a current image LPA that is generated via the surface Sr and the light. The displacement detecting module 605 computes at least one kind of brightness information of the current image LPA, respectively sets corresponding threshold values to different kinds of the brightness information, and determines if a contrast enhancing operation should be performed to the current image LPA to generate an adjusted image PLPA according to a number that the brightness information is over the threshold value. The displacement detecting module 605 determines if displacement exists between the Surface Sr and the optical navigating apparatus 600 according to the adjusted image PLPA if the displacement detecting module 605 performs the contrast enhancing operation. The displacement detecting module 605 determines if displacement exists between the surface Sr and the optical navigating apparatus 600 according to the current image LPA if the displacement detecting module 605 does not perform the contrast enhancing operation.

In one embodiment, the displacement detecting module 605 comprises an image signal processing unit 607, an image signal analyzing unit 609 and a displacement computing unit 611 (but not limited). The image signal processing unit 607 and the image signal analyzing unit 609 respectively receives the current image LPA. The image signal analyzing unit 609 analyzes brightness information of the current image LPA and transmits the brightness information LI to the image signal processing unit 607. Also, the image signal analyzing unit 609 can analyze several previous images and store the brightness information thereof. The image signal processing unit 607 determines if the contrast enhancing operation should be performed or not according to the brightness information LI. The displacement computing unit 611 determines if displacement exists between the Surface Sr and the optical navigating apparatus 600 and outputs the displacement information MI according to the current image LPA if the image signal processing unit 607 does not perform the contrast enhancing operation. On the contrary, the displacement computing unit 611 determines if displacement exists between the surface Sr and the optical navigating apparatus 600 and outputs the displacement information MI according to the adjusted image PLPA if the image signal processing unit 607 performs the contrast enhancing operation. In one embodiment, the displacement information MI is transmitted to the control unit 613, and then the control units accordingly controls the light source 601 and the image sensor, but not limited.

Other detail operations of the optical navigating apparatus 600 can be acquired according to above-mentioned embodiments, thus it is omitted for brevity here.

In view of above-mentioned embodiments, various kinds of brightness information can be utilized to determine if the image should be adjusted or not. Also, the indefinite feature of the brightness information or the image can be utilized to determine how to adjust the contrast of the image. By this way, a more clear image can be acquired, thereby the problem that the image may be out of focus or has indefinite features as described in the prior art can be solved. Also, the optical navigation utilizing the images adjusted by these mechanisms can perform more accurate displacement detecting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable recording medium, having at least one program code recorded thereon, an image adjusting method can be performed when the program code is read and executed, wherein the image adjusting method is applied to an optical navigating apparatus comprising an image sensor and a displacement detecting module, wherein the image adjusting method comprises:
   (a) catching a current image via the image sensor;
   (b) computing at least one kind of brightness information of the current image via the displacement detecting module;
   (c) respectively setting corresponding threshold values to different kinds of the brightness information via the displacement detecting module; and
   (d) determining if a contrast enhancing operation should be performed to the current image to generate an adjusted image according to a number that the brightness information is over the threshold value via the displacement detecting module, and determining a ratio for the contrast enhancing operation according to the number that the brightness information is over the threshold value via the displacement detecting module.

2. The non-transitory computer readable recording medium of claim 1, wherein the brightness information has at least one of following information:
   an average brightness value of the current image;
   a maximum brightness value of the current image; and
   a minimum brightness value of the current image.

3. The non-transitory computer readable recording medium of claim 2, wherein the brightness information comprises at least one kind of information described below:
   a brightness range of the current image;
   a pixel number for current image pixels having a brightness value smaller than a minimum brightness threshold value;
   a pixel number for current image pixels having a brightness value larger than a maximum brightness threshold value; and
   a maximum value of brightness value differences for adjacent pixels of the current image.

4. The non-transitory computer readable recording medium of claim 1, wherein the brightness information comprises an average brightness value of the current image, where the contrast enhancing operation comprises:
   computing a brightness value difference between a pixel to be adjusted brightness value for a pixel to be adjusted in the current image and the average brightness value; and
   adjusting the pixel to be adjusted according to the brightness value difference, the pixel to be adjusted brightness value and the brightness information.

5. The non-transitory computer readable recording medium of claim 4, wherein the image adjusting method utilizes a following equation to perform the contrast enhancing operation:

$$P'=P+(P-\text{avg}_{cur})*K$$

wherein P indicates the pixel to be adjusted brightness value before adjusting, P' indicates the pixel to be adjusted brightness value after adjusting, $\text{avg}_{cur}$ indicates the average brightness value of the current image;
   wherein K is relative to the brightness information, is a rational number and is the ratio for the contrast enhancing operation.

6. The non-transitory computer readable recording medium of claim 1, wherein the image adjusting method further comprises computing an average brightness value of a previous image, where the contrast enhancing operation further comprises:
   computing a brightness value difference between a pixel to be adjusted brightness value for a pixel to be adjusted in the current image and the average brightness value; and
   adjusting the pixel to be adjusted according to the brightness value difference, the pixel to be adjusted brightness value and the brightness information.

7. The non-transitory computer readable recording medium of claim 6, wherein the image adjusting method utilizes a following equation to perform the contrast enhancing operation:

$$P'=P+(P-\text{avg}_{pre})*K$$

wherein P indicates the pixel to be adjusted brightness before adjusting, P' indicates the pixel to be adjusted brightness after adjusting, $\text{avg}_{pre}$ indicates the average brightness value of the previous image
   wherein K is relative to the brightness information is a rational number and is the ratio for the contrast enhancing operation.

8. The non-transitory computer readable recording medium of claim 1, wherein the current image and the adjusted image have the same average brightness value.

9. The non-transitory computer readable recording medium of claim 1, wherein the image adjusting method further comprises performs a de-gradient operation to process the current image after the step (a).

10. An optical navigating apparatus, comprising:
    at least one light source, for emitting light to an object;
    an image sensor, for catching a current image that is generated via the object and the light; and
    a displacement detecting module, for computing at least one kind of brightness information of the current image, for respectively setting corresponding threshold values to different kinds of the brightness information, and for determining if a contrast enhancing operation should be performed to the current image to generate an adjusted image according to a number that the brightness information is over the threshold value;
    wherein the displacement detecting module determines if displacement exists between the object and the optical navigating apparatus according to the adjusted image if the displacement detecting module performs the contrast enhancing operation;
    wherein the displacement detecting module determines if displacement exists between the object and the optical navigating apparatus according to the current image if the displacement detecting module does not perform the contrast enhancing operation; wherein the displacement detecting module determines a ratio for the contrast enhancing operation according to the number that the brightness information is over the threshold value.

11. The optical navigating apparatus of claim 10, wherein the brightness information has at least one of following information:
   an average brightness value of the current image;
   a maximum brightness value of the current image; and
   a minimum brightness value of the current image.

12. The optical navigating apparatus of claim 11, wherein the brightness information comprises at least one kind of information described below:
   a brightness range of the current image;
   a pixel number for current image pixels having a brightness value smaller than a minimum brightness threshold value;
   a pixel number for current image pixels having a brightness value larger than a maximum brightness threshold value; and
   a maximum value of brightness value differences for adjacent pixels of the current image.

13. The optical navigating apparatus of claim 10, wherein the brightness information comprises an average brightness value of the current image, where the contrast enhancing operation comprises:
   computing a brightness value difference between a pixel to be adjusted brightness value for a pixel to be adjusted in the current image and the average brightness value; and
   adjusting the pixel to be adjusted according to the brightness value difference, the pixel to be adjusted brightness value and the brightness information.

14. The optical navigating apparatus of claim 13, wherein the displacement detecting module utilizes a following equation to adjust the pixel to be adjusted of the current image to perform the contrast enhancing operation:

$$P'=P+F(P-\text{avg}_{cur})*K$$

wherein P indicates the pixel to be adjusted brightness value before adjusting, P' indicates the pixel to be adjusted brightness value after adjusting, $\text{avg}_{cur}$ indicates the average brightness value of the current image;

wherein K is relative to the brightness information, is a rational number and is the ratio for the contrast enhancing operation.

15. The optical navigating apparatus of claim 10, wherein the displacement detecting module further computes an average brightness value of a previous image, where the contrast enhancing operation further comprises:
   computing a brightness value difference between a pixel to be adjusted brightness value for a pixel to be adjusted in the current image and the average brightness value; and
   adjusting the pixel to be adjusted according to the brightness value difference, the pixel to be adjusted brightness value and the brightness information.

16. The optical navigating apparatus of claim 15, wherein the displacement detecting module utilizes a following equation to adjust the pixel to be adjusted of the current image to perform the contrast enhancing operation:

$$P'=P+(P-\text{avg}_{pre})*K$$

wherein P indicates the pixel to be adjusted brightness before adjusting, P' indicates the pixel to be adjusted brightness after adjusting, $\text{avg}_{pre}$ indicates the average brightness value of the previous image;

wherein K is relative to the brightness information, is a rational number and is the ratio for the contrast enhancing operation.

17. The optical navigating apparatus of claim 10, wherein the current image and the adjusted image have the same average brightness value.

18. The optical navigating apparatus of claim 10, wherein the displacement detecting module further performs a de-gradient operation to process the current image after the image sensor catches the current image.

19. The non-transitory computer readable recording medium of claim 1, wherein the ratio for the contrast enhancing operation is related with an enhancing amount of the contrast enhancing operation.

20. The optical navigating apparatus of claim 10, wherein the ratio for the contrast enhancing operation is related with an enhancing amount of the contrast enhancing operation.

* * * * *